United States Patent
Majmundar

(10) Patent No.: US 10,206,142 B2
(45) Date of Patent: *Feb. 12, 2019

(54) FLOW CONTROL IN MULTI-RAT 5G WIRELESS NETWORKS

(71) Applicant: AT&T Intellectual Property I, L.P., Atlanta, GA (US)

(72) Inventor: Milap V. Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,036

(22) Filed: Jun. 7, 2018

(65) Prior Publication Data

US 2018/0288653 A1 Oct. 4, 2018

Related U.S. Application Data

(63) Continuation of application No. 15/089,742, filed on Apr. 4, 2016, now Pat. No. 10,021,597.

(51) Int. Cl.
*H04W 28/10* (2009.01)
*H04W 28/02* (2009.01)

(52) U.S. Cl.
CPC ....... *H04W 28/10* (2013.01); *H04W 28/0247* (2013.01)

(58) Field of Classification Search
None
See application file for complete search history.

(56) References Cited

U.S. PATENT DOCUMENTS

| 8,817,806 | B2 | 8/2014 | Kim et al. | |
| 2007/0183387 | A1* | 8/2007 | Pecen | H04W 72/1242 370/345 |
| 2012/0042060 | A1* | 2/2012 | Jackowski | H04L 47/2475 709/224 |
| 2013/0176988 | A1 | 7/2013 | Wang et al. | |
| 2014/0204743 | A1* | 7/2014 | Garcia | H04L 47/18 370/231 |
| 2014/0282769 | A1* | 9/2014 | Salem | H04N 1/23406 725/94 |
| 2014/0362704 | A1 | 12/2014 | Jha et al. | |
| 2015/0036511 | A1* | 2/2015 | Cheng | H04W 28/04 370/242 |
| 2015/0085800 | A1 | 3/2015 | Sivanesan et al. | |
| 2015/0215824 | A1 | 7/2015 | Nigam et al. | |
| 2015/0215827 | A1 | 7/2015 | Zhang et al. | |
| 2015/0264596 | A1 | 9/2015 | Franklin et al. | |

(Continued)

OTHER PUBLICATIONS

Non-Final Office Action received for U.S. Appl. No. 15/089,742 dated Sep. 7, 2017, 16 pages.

*Primary Examiner* — Mohammad S Adhami
(74) *Attorney, Agent, or Firm* — Amin, Turocy & Watson, LLP

(57) ABSTRACT

Traffic flow control is facilitated in a multi-radio access technology wireless network infrastructure. A qualification threshold value can be determined for a slave node device, as a function of the qualification threshold value, a data volume threshold value can be determined for the slave node device, and, as a function of the data volume threshold value, transmission of data to a user equipment device can be facilitated by the slave node device.

20 Claims, 10 Drawing Sheets

(56) References Cited

U.S. PATENT DOCUMENTS

| | | |
|---|---|---|
| 2015/0350953 A1 | 12/2015 | Himayat et al. |
| 2015/0373759 A1 | 12/2015 | Wang et al. |
| 2016/0021581 A1 | 1/2016 | Deenoo et al. |
| 2016/0028585 A1 | 1/2016 | Wager et al. |
| 2016/0029421 A1 | 1/2016 | Wang et al. |
| 2016/0323167 A1* | 11/2016 | Osuga ................. H04L 43/0852 |
| 2017/0094016 A1* | 3/2017 | Chen ..................... H04L 67/325 |

* cited by examiner

FLOW CONTROL IN MULTI-RAT 5G WIRELESS NETWORKS

RELATED APPLICATION

The subject patent application is a continuation of, and claims priority to, U.S. patent application Ser. No. 15/089,742, filed Apr. 4, 2016, and entitled "FLOW CONTROL IN MULTI-RAT 5G WIRELESS NETWORKS," the entirety of which application is hereby incorporated by reference herein.

TECHNICAL FIELD

The disclosed subject matter relates to the provision of efficient traffic flow control in wireless communication networks, such as a multi-radio access technology 5G.

BACKGROUND

It is projected that next generation 5G wireless networks will comprise multiple radio access technologies (RATs) coexisting seamlessly within a defined/definable geographical area. The underlying components that are projected to underpin such seamless coexistence will be extensions to the dual connectivity framework outlined in Release 12 of the 3rd Generation Partnership Project (3GPP) 3GPP specifications in the context of Long Term Evolution (LTE)-Advanced networks.

DETAILED DESCRIPTION

Figure 1:
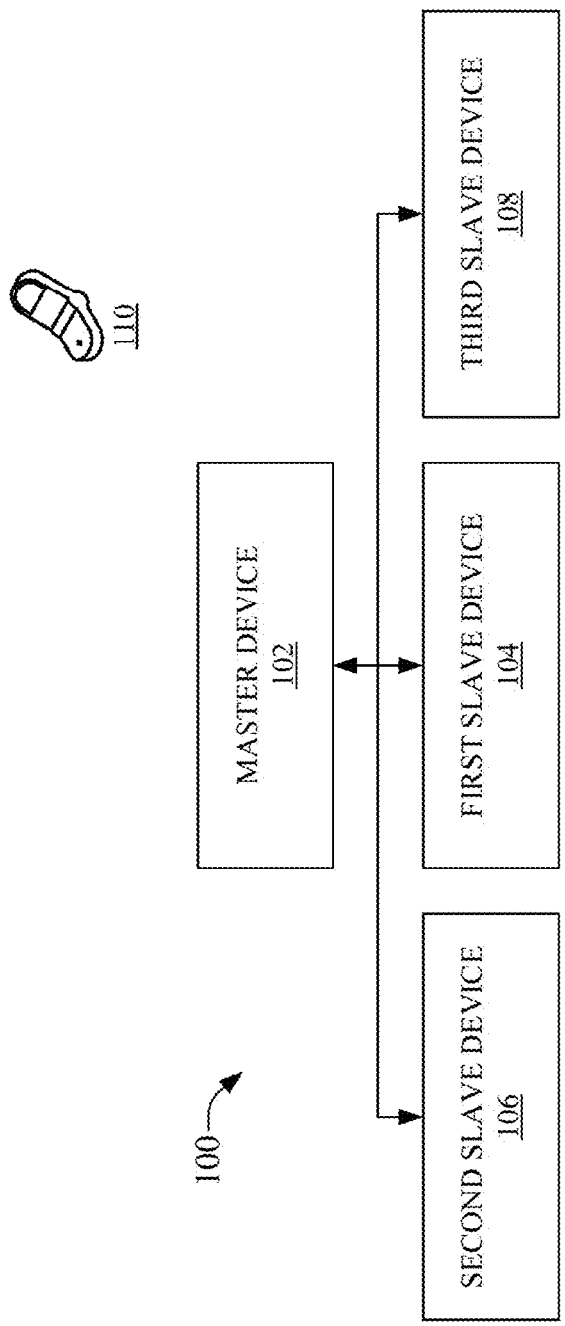
FIG. 1 is an illustration of a system for providing efficient traffic flow control in wireless communication networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The subject disclosure describes and provides systems and methods for an efficient traffic flow control in wireless communication networks, such as multi-radio access technology 5G communication infrastructures. The disclosed systems and methods, in accordance with an embodiment, provide a system, apparatus, or device comprising: a processor, and a memory that stores executable instructions that, when executed by the processor, facilitate performance of operations. The operations can comprise determining qualification threshold values for slave node devices within the coverage or broadcast area of the system, apparatus, or device; as a function of the qualification threshold value, determining data volume threshold values for the slave node devices; and as a function of the data volume threshold values, facilitating transmission of data to a user equipment device by one or more of the slave node devices.

Further operations can include determining the qualification threshold values for each of the slave node devices as a function of a product of a minimum latency value associated with transferring a byte of data for the user equipment device to one of the slave node devices and a data throughput rate for the transmission of the data, by the system, apparatus, or device, to the user equipment device; determining the data volume threshold values for the slave node devices as a function of comparing a first latency value associated with a first transmitting of a byte of data via one of the slave node devices and a second latency value associated with a second transmitting of the byte of data by the device; and where the transmission of data to the user equipment device by the slave node device is a first transmission, receiving feedback data representing a buffer size value of a buffer allocated for second transmissions to be transmitted to the user equipment device by the slave node device. The feedback data can further comprise a first value representing an amount of data queued awaiting transmission to the user equipment device between the device and the slave node device; and a second value representing an average data rate determined to have been experienced by the user equipment device and the slave node device.

Additional operations can include excluding the slave node device from a grouping of slave node devices as a function of a buffer size value of a buffer allocated for data transmissions to the user equipment device on the device, system, or apparatus being determined to exceed the qualification value; and where the transmission of data to the user equipment device by the slave node device is a first transmission, offloading second transmissions associated with the user equipment device to a first slave node device in response to the first slave node device being determined to be associated with a lowest data volume threshold value.

In accordance with a further embodiment, the subject disclosure describes a method, comprising a series of acts that can include: determining a first threshold value for a slave node device; determining a second threshold value for the slave node device based on the first threshold value; and facilitating transmission of data to a user equipment device using a transmission functionality associated with the slave node device based on the second threshold value.

Additional acts can include determining the first threshold value as a function of a product of the latency value associated with transferring a byte of data for the user equipment device to a slave node device and a data throughput rate for the transmission of the data to the user equipment device; determining the second threshold value as a function of comparing a first latency value associated a first transmission of a byte of data via the slave node device and a second latency value associated with a transmission of the byte of data by the system; and where the transmission of data is a first transmission of first data, receiving feedback data representing a buffer size value of a buffer allocated for second transmissions of second data to be transmitted to the user equipment device by the slave node device. The feedback data further comprises a first value representing an amount to data queued up (e.g., in an allocated buffer) in transit (e.g., awaiting transmission) to the user equipment device between the system and the slave node device, and a second value representing an average data rate experienced by the user equipment device and the slave node device.

Further acts that can be performed can include excluding the slave node device from a grouping of slave node devices as a function of a buffer size value of a buffer allocated for data transmissions to the user equipment device at the system exceeding the first threshold value and offloading transmission data associated with the user equipment device to the slave node device.

In accordance with a still further embodiment, the subject disclosure describes a machine readable storage medium, a computer readable storage device, or non-tangible machine readable media comprising instructions that, in response to execution, cause a computing system comprising at least one processor to perform operations. The operations can include: receiving feedback data representing a buffer size value of a buffer allocated for future data transmissions to be transmitted to a user equipment device by a slave node device; as a function of the feedback data, determining a qualification threshold value for the slave node device; as a function of the qualification threshold value, determining a data volume threshold value for the slave node device; and as a function of the data volume threshold value, facilitating transmission of a data transmission to a user equipment device by the slave node device.

Further operations can include determining the qualification threshold value as a function of the product of a latency value associated with a first transfer of a byte of data to the user equipment device using a functionality provided by the slave node device and a data throughput rate for a second transfer of the data transmission, by the system, to the user equipment device; and determining the data volume threshold value as a function of comparing a first latency value associated with a first transmission of a byte of data via the slave node device and a second latency value associated with a second transmission of the byte of data by the system.

Now with reference to the Figures. FIG. 1 illustrates a system 100 that provides efficient traffic flow control in multi-radio access technology 5G wireless communication networks, in accordance with an embodiment. As depicted in FIG. 1 system 100 comprises a master device 102, a first slave device 104, a second slave device 106, and a third slave device 108. Master device 102 can be in wired or wireless communication with first slave device 104, second slave device 106, and third slave device 108. Master device 102, for purposes of exposition, can be a base station device, such as an eNodeB device, operating, in the context of the subject application, under the next generation 5G multiple radio access technology (RAT) paradigm in the 6 GHz frequency band range, for example. First slave device 104 can also be base station device, such as an eNodeB device, that can be operating under the next generation 5G multiple radio access technology (RAT) paradigm but in the mmWave frequency band, for instance. Second slave device 106 can be a further base station device (e.g., eNodeB device) but, in this instance, is operational in a disparate radio access technology, such as the Long Term Evolution (LTE) radio access paradigm. Third slave device 108 can be a further eNodeB device using the Wi-Fi radio access paradigm, for example. It should be appreciated that master device 102, first slave device 104, second slave device 106, and third slave device 108, for purposes of illustration, are each operating under disparate and different radio access technology paradigms.

Under the proposed connectivity framework, data transmissions from the wider wireless communications network to a device (e.g., user equipment device 110) operational and in communication with master device 102 and/or the slave devices (e.g., first slave device 104, second slave device 106, and/or third slave device 108) can be split between master device 102 and one or more slave devices (e.g., first slave device 104, second slave device 106, and/or third slave device 108) at the packet data convergence protocol (PDCP) layer of the radio access network user plane protocol stack (Xn interface) operational on master device 102. The splitting of data transmissions between master device 102 and the one or more slave devices (e.g., first slave device 104, second slave device 106, and/or third slave device 108) can be done with the aid of a traffic splitting process that accomplishes flow control between master device 102 and the one or more slave devices (e.g., first slave device 104, second slave device 106, and/or third slave device 108).

The traffic splitting algorithm/process operational on master device 102 provides traffic flow control in a multi-connectivity framework, wherein the packet data convergence protocol layer (PDCP) in conjunction with the disclosed traffic splitting process executing on master device 102 utilizes information fed back from the one or more slave devices (e.g., first slave device 104, second slave device 106, and/or third slave device 108) to determine or ascertain which of the one or more slave devices (e.g., first slave device 104, second slave device 106, and/or third slave device 108) is capable of facilitating transmission of user plane data to one or more user equipment devices operational within the geographical coverage area of, and on behalf of, master device 102.

The traffic splitting process/algorithm operational on master device 102 at the packet data convergence protocol layer of master device 102, determines, for each user equipment device k serviced by master device 102 and each of the affiliated/associated slave devices (e.g., first slave device 104, second slave device 106, and/or third slave device 108), which of the one or more slave devices (e.g., first slave device 104, second slave device 106, and/or third slave device 108) are capable of facilitating transmission of user plane data to one or more user equipment devices extant within the geographical coverage area, and on behalf, of master device 102.

The process can be effectuated and commence on master device 102 by master device 102 determining an exclusionary threshold value or a minimum qualification threshold value (Th$_{smin}$) for each slave device (e.g., first slave device 104, second slave device 106, and/or third slave device 108). The exclusionary threshold value or minimum qualification threshold value (Th$_{smin}$) is typically the minimum amount of data that needs to be accumulated in a buffer associated with the master device 102 at which point, in order to improve and/or optimize traffic flow, it makes sense to transmit further data via one or more slave devices (e.g., first slave device 104, second slave device 106, and/or third slave device 108). The exclusionary threshold value or minimum qualification threshold value generally is estimated by master device 102 for each slave device (e.g., first slave device 104, second slave device 106, and/or third slave device 108), wherein a minimum latency (L$_{smin}$) value is determined for each slave device (e.g., first slave device 104, second slave device 106, and/or third slave device 108) with spare capacity to transmit an additional byte of data to a representative user equipment device k from a buffer associated with master device 102 through each slave device (e.g., first slave device 104, second slave device 106, and/or third slave device 108) can be determined as:

$$L_{S\,min} = T_{m,s} + \frac{B_s + Q_s}{R_S},$$

where T$_{m,s}$ represents a one way transport latency between master device 102 (denoted as m) and a slave device (denoted as s), B$_s$ represents a buffer size allocated for the representative user equipment device k at slave device s, Q$_s$ is the amount to data queued up in transit over the transport network for the representative user equipment device k between master device m and the slave device s, and R$_s$ represents the average data rate experienced by the representative user equipment device k at the slave device s.

Once master device 102 has determined the minimum latency (L$_{smin}$) value needed to transmit an additional byte of data to a representative user equipment device k from master device 102 through a slave device s, master device 102 can make a determination in regard to the minimum threshold of data value (Th$_{smin}$) required in a buffer associated with master device 102 for the representative user equipment device k before it becomes beneficial to transfer data for transmission to one or more of the slave devices s (e.g., first slave device 104, second slave device 106, and/or third slave device 108). In order for one or more slave devices s to qualify for data from master device 102, master device 102 needs to determine or ascertain whether the following exclusionary condition is satisfied for each of the slave devices (e.g., first slave device 104, second slave device 106, and/or third slave device 108):

$$B_m > Th_{s\,min},$$

where Th$_{smin}$=R$_m$×L$_{smin}$, and B$_m$ is the buffer size for a representative user equipment device k (e.g., user equipment device 110) allocated at the master device m (e.g., master device 102), and R$_m$ is the average data rate experienced by user equipment device k (e.g., user equipment device 110) at the master device m (e.g., master device 102).

In response to master device 102 having identified slave devices (or a set/group/grouping of qualifying slave devices, wherein for the purposes of this exposition, and/or under identified/identifiable/defined/definable circumstances, a set is not an empty set and/or not a null set, and/or has at least one member) that satisfy the foregoing exclusionary condition/threshold (e.g., B$_m$>Th$_{smin}$), master device 102 can determine and employ a further threshold (an optimal/optimality threshold value). This further threshold (e.g., optimal/optimality threshold value) is of benefit because when an increasing amount of data is split from the master device m (e.g., master device 102) and directed towards the one or more of the qualifying slave devices s (e.g., one or more of first slave device 104, second slave device 106, and/or third slave device 108) for transmission to a representative user equipment device k (e.g., user equipment device 110), the corresponding latency to transmit each additional byte/bit using the facilities provided by the one or more identified slave devices s (e.g., one or more of first slave device 104, second slave device 106, and/or third slave device 108), rather than the master device m (e.g., master device 102), can increase commensurately. At some point an upper bound/threshold can be reached when it no longer is beneficial to transmit any further data to a representative user equipment device k (e.g., user equipment device 110) using the functionalities supplied by the one or more identified/qualifying slave devices s (e.g., one or more of first slave device 104, second slave device 106, and/or third slave device 108). This boundary/threshold (optimal/optimality threshold value, denoted as Th$_{sopt}$) can represent a data volume threshold value at which transmission of one additional byte/bit of data represents/experiences the same latency as if that one additional byte/bit were transmitted via facilities provided by the master device m (e.g. master device 102) rather than the one or more identified slave devices s (e.g., one or more of first slave device 104, second slave device 106, and/or third slave device 108). This bound/threshold value can be determined by solving for Th$_{sopt}$ in the following equation:

$$\frac{Th_{sopt}}{R_m} = T_{m,s} + \frac{B_s + Q_s + (B_m + Th_{sopt})}{R_s},$$

which, when simplified provides:

$$Th_{sopt} = \frac{((T_{m,s} \times R_s) + B_s + Q_s + B_m) \times R_m}{(R_m + R_s)}.$$

Thus, for all selected/identified/qualifying slave devices (one or more of first slave device 104, second slave device 106, and/or third slave device 108) optimum threshold values can be determined and assigned to each of the selected/identified/qualifying slave devices (e.g., s=1 . . . S) by master device 102. As a function of the optimum threshold value associated to each of the selected/identified/qualifying slave devices (e.g., s=1 . . . S), a ranking or ordering can be imposed by master device 102, wherein slave devices (e.g., s=1 . . . S) that are associated with smaller optimal threshold values are ranked or ordered higher than slave devices that have larger optimal threshold values.

Once master device 102 has ranked and/or sorted the qualified/identified slave devices (e.g., s=1 . . . S) in ascending order, data transmissions from master device 102 (or more particularly the buffer associated with master device 102) for transmission to representative user equipment device k (e.g., user equipment device 110) can be offloaded to one or more of the qualified/identified slave devices (e.g., s=1 . . . S) beginning with slave devices that have the lowest optimum/optimal threshold value ($Th_{sopt}$) using, or as a function of, a water filling process.

Figure 6:
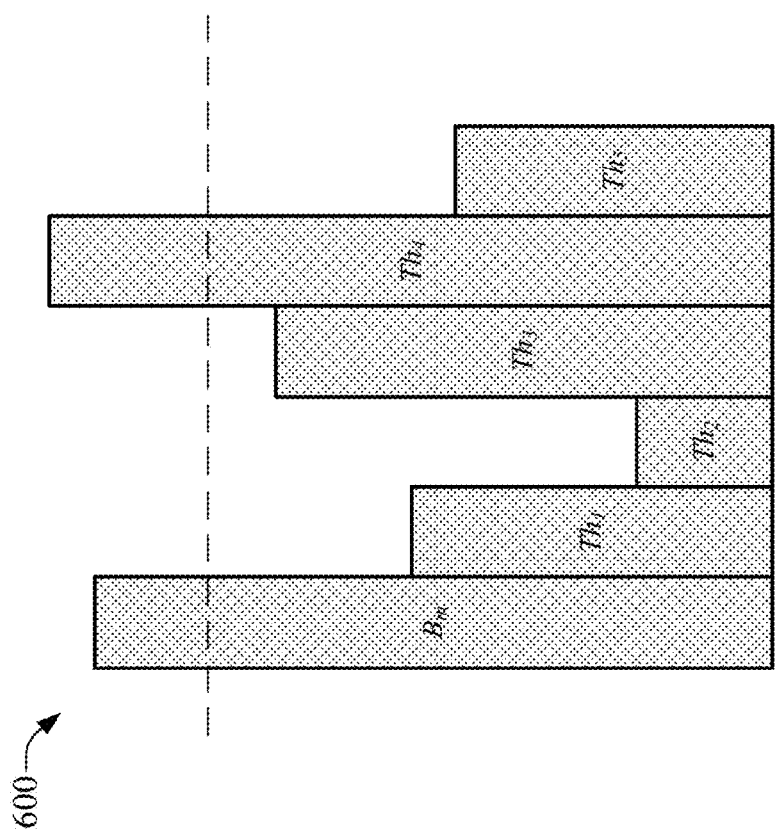
FIG. 6 provides illustration of a water filling process/technique effectuated to provide efficient traffic flow control in wireless communication infrastructures, in accordance with aspects of the subject disclosure.

The water filling process/technique effectuated by master device 102 can be more clearly be understood in reference to FIG. 6. As illustrated in FIG. 6, the buffer size allocated for a representative user equipment device k (e.g., user equipment device 110) at master device 102 can be represented as $B_m$ and the determined optimal threshold values, ascertained and assigned by master device 102, for each of the slave devices (in this illustration there are five viable slave devices that are subordinate to the master device) that have been assigned optimal threshold values of $Th_1$, $Th_2$, $Th_3$, $Th_4$, and $Th_5$. Based on, as a function of, and/or in response to, determining and assigning each of the optimal threshold values (e.g., in this instance, $Th_1$, $Th_2$, $Th_3$, $Th_4$, and $Th_5$), master device 102 can offload data transmissions temporarily persisted or stored in a buffer of buffer size $B_m$ allocated for the transmission of data to the representative user equipment device k at master device 102 (and for subsequent data transmission to the representative user equipment device k (e.g., user equipment device 110)), in the following manner. Initially, master device 102 can offload transmission of data (directed to the representative user equipment device k) to a first slave device that has been assigned optimal threshold value $Th_2$. Master device 102 can continue utilizing the facilities of the first slave device that has been assigned the optimal threshold value $Th_2$ to transmit user data to the representative user equipment device k until the optimal threshold value $Th_5$ associated with a second slave device is reached, at which point master device 102 can commence using the transmission facilities provided by both the first slave device, assigned optimal threshold value $Th_2$, and the second slave device, assigned the optimal threshold value $Th_5$. This pattern of using the transmission facilities of identified/qualified slave devices associated with optimal threshold values can continue until, for example, the buffer size $B_m$ allocated by master device 102 for data transmission to the representative user equipment device k on master device 102 has been exhausted. It should be noted without limitation and/or loss of generality, that in the instance depicted in FIG. 6, the transmission facilities associated with the slave device that has been assign the optimal threshold value $Th_4$ may typically not be employed in this instance of time as the determined optimal threshold value $Th_4$, as depicted, exceeds the buffer size $B_m$ allocated on master device 102 by master device 102 for data transmissions to the representative user equipment device k.

It should be noted without limitation or loss of generality in the context of the above disclosed and described water filling process/technique, that such a technique is but one optimization strategy that can be utilized to effectuate and/or facilitate providing efficient traffic flow control in multi-radio access technology wireless communication infrastructures. As will be appreciated by those skilled in the art, other linear and/or non-linear optimization techniques can also be employed with equal facility and/or functionality to accomplish the same ends and goals. Further, in the context of the foregoing, the water filling process/technique detailed above determines how much data to send to different slave node devices for one particular user, rather than determining allocation fractions across disparate and/or different users in a wireless communication network/infrastructure.

Returning briefly to FIG. 1, master device 102, in addition to using determined optimal threshold values assigned to each identified/qualified slave device to ascertain the ordering or ranking with which master device 102 should offload to identified/qualified slave devices data transmissions, can additionally and/or alternatively employ as a multiplier, a biasing coefficient $\alpha_s$ value, wherein the value of the product of biasing coefficient $\alpha_s$ and the optimum threshold value ($Th_{sopt}$) determined for each slave device at issue (e.g., first slave device 104, second slave device 106, and/or third slave device 108) either diminishes or boosts the optimum threshold value ($Th_{sopt}$), thereby making it less or more likely that master device 102 will offload data traffic to a particular slave device in relation to other slave devices. For instance, conditions that can influence the determination of the optimal threshold values can include, a slave device (e.g., one or more of first slave device 104, second slave device 106, and/or third slave device 108) is approaching a known busy hour based on a traffic pattern history; instances where Physical Resource Block (PRB) licensing or spectrum licensing constraints are applicable at a slave device; and/or skewing or preferentially causing, based at least in part on or as a function of the biased optimum threshold value (e.g., $\alpha_s \times Th_{sopt}$), selection of licensed band slave device over unlicensed slave devices.

It should be noted in regard to determinations of the foregoing latency values, qualification threshold values, and/or data volume threshold values, as set forth herein, other or additional and/or alternative strategies, formulae, processes, and/or techniques can also be utilized without departing from the scope and intent of the subject disclosure. These other or additional and/or alternative formulae, strategies, processes, techniques, and the like, can be employed with equal facility and/or functionality to determine the relevant latency values, qualification threshold values, and/or data volume threshold values.

In connection with FIG. 1 it will have been noted by those skilled in the art, master device 102, first slave device 104, second slave device 106, and/or third slave device 108 can each be base station devices and, though not illustrated, can comprise multiple antenna groups, transmitter chains and/or receiver chains, which can in turn comprise a plurality of components/devices associated with signal transmission and signal reception (e.g., processors, modulators, multiplexers, demodulators, demultiplexers, antennas etc.). Moreover, as will be further appreciated, master device 102, first slave device 104, second slave device 106, and/or third slave device 108 can be in continuous or sporadic wireless and/or wired communication with one or more user equipment devices (e.g., user equipment device 110) and/or access terminals (not shown); it is to be appreciated that master device 102, first slave device 104, second slave device 106, and/or third slave device 108 can be in communication with substantially any number of user equipment devices and/or access terminal devices, wherein such user equipment devices and/or access terminal devices can be, for example, cell phones, smart phones, laptops, handheld communication devices, handheld computing devices, satellite radios, global positioning systems, personal digital assistants (PDAs), and/or any other suitable device for communicating over a wireless communication infrastructure.

Master device 102, first slave device 104, second slave device 106, and/or third slave device 108 can be any type of mechanism, machine, device, facility, apparatus, and/or instrument that includes a processor and/or is capable of effective and/or operative communication with a network topology. Mechanisms, machines, apparatuses, devices, facilities, and/or instruments that can comprise master device 102, first slave device 104, second slave device 106, and/or third slave device 108 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

As has been briefly noted above, user equipment device 110, in addition to comprising cell phones, smart phones, laptops, handheld communication devices, handheld computing devices, satellite radios, global positioning systems, personal digital assistants (PDAs), and/or any other suitable device for communicating over a wireless communication infrastructure, can be any type of mechanism, machine, device, facility, and/or instrument that includes a processor and/or is capable of effective and/or operative communication with a network topology. Illustrative mechanisms, machines, devices, facilities, and/or instruments of execution that can additionally comprise user equipment device 110 can include tablet computing devices, handheld devices, server class computing machines and/or databases, laptop computers, notebook computers, desktop computers, consumer appliances and/or instrumentation, industrial devices and/or components, hand-held devices, personal digital assistants, multimedia Internet enabled phones, multimedia players, and the like.

Figure 2:
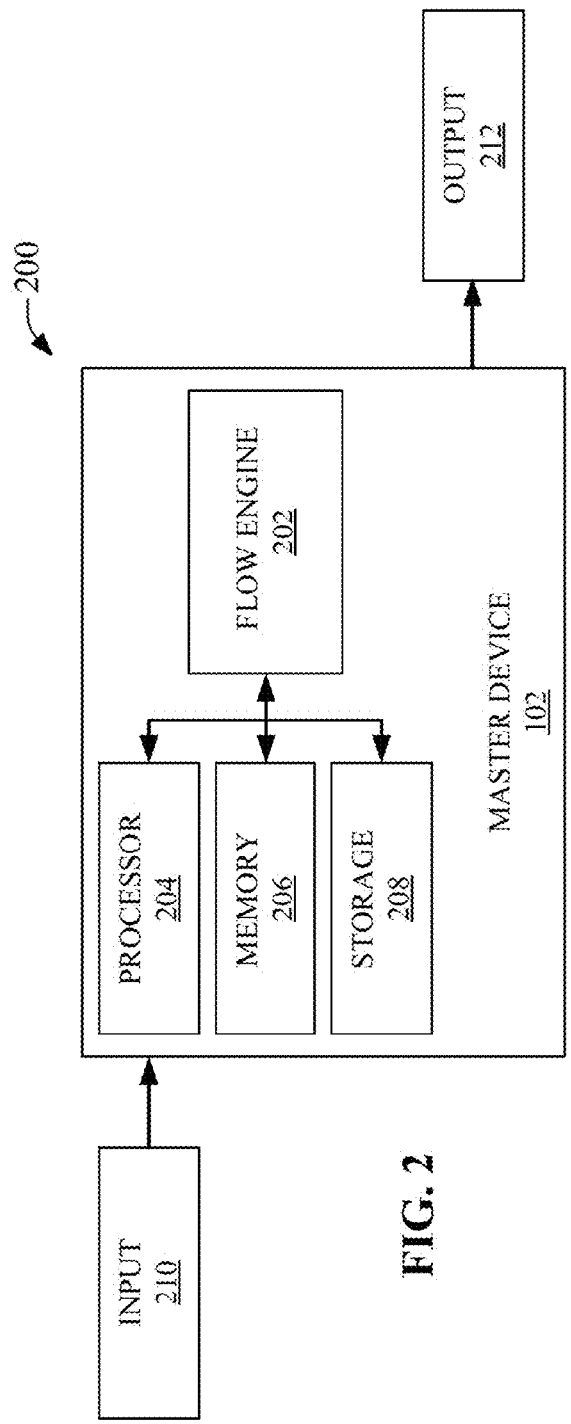
FIG. 2 is a further depiction of a further system for providing efficient traffic flow control in multi-radio access technology wireless communication networks, in accordance with aspects of the subject disclosure.

In reference to FIG. 2, depicted therein is a further illustration 200 of master device 102 that in accordance with disclosed aspects provides efficient traffic flow control in a multi-radio access technology wireless communication network. As illustrated, master device 102 can include a flow engine 202 that can be coupled to a processor 204, memory 206, and storage 208. Flow engine 202 can be in communication with processor 104 for facilitating operation of computer or machine executable instructions and/or components by flow engine 202, memory 206, for storing data and/or the computer or machine executable instructions and/or components, and storage 208 for providing longer term storage of data and/or machine and/or computer executable instructions. Additionally, master device 102 can also receive input 210 for use, manipulation, and/or transformation by flow engine 202 to produce one or more useful, concrete, and tangible result and/or transform one or more articles to different states or things. Further, master device 102 can also generate and output the useful, concrete, and tangible result and/or the transformed one or more articles produced by flow engine 202 and output as output 212.

As was noted above, under the proposed dual connectivity framework, data transmissions from the wider wireless communication network to a device, such as user equipment device 110, operational and in communication with master device 102 can be split between master device 102 and one or more slave devices at the packet data convergence protocol (PDCP) layer of the radio access network user plane protocol stack (Xn interface) of the master device 102.

In order to facilitate the splitting of data transmissions from the wider wireless communication network to a user equipment device, flow engine 202, in conjunction with the packet data convergence protocol layer operational on master device 102, determines, for each user equipment device k (user equipment device 110) serviced by master device 102 and each slave device affiliated with master device 102 (e.g., first slave device 104, second slave device 106, and/or third slave device 108), which of the associated slave devices are capable of facilitating transmission of user plane data to each user equipment device k within the service coverage area of master device 102.

In order to achieve this objective, flow engine 202 in conjunction with processor 204 can determine a preclusive threshold value or a minimum qualification threshold value ($Th_{smin}$) for each slave device. The preclusive threshold value or minimum qualification threshold value ($Th_{smin}$) is typically the minimum amount of data that needs to be accumulated in a buffer (e.g., memory 206) associated with and allocated by the master device 102 and at which point, in order to improve traffic flow, it becomes necessary to transmit further data via one or more slave devices. The exclusionary/preclusive threshold value or minimum qualification threshold value generally is estimated by flow engine 202 for each slave device, wherein a minimum latency ($L_{smin}$) value is determined by flow engine 202 for each slave device needed to transmit an additional byte of data to a representative user equipment device k from a buffer associated with master device 102 through each slave device can be determined as:

$$L_{S\,min} = T_{m,s} + \frac{B_s + Q_s}{R_S}$$

where $T_{m,s}$ represents a one way transport latency between master device 102 (denoted as m) and a slave device (denoted as s), $B_s$ represents a buffer size allocated for the representative user equipment device k at slave device s, $Q_s$ is the amount to data queued up in transit over the transport network for the representative user equipment device k between master device m and the slave device s, and $R_s$ represents the average data rate experienced by the representative user equipment device k at the slave device s.

Once flow engine 202 has determined the minimum latency ($L_{smin}$) value required to transmit an additional byte of data to a representative user equipment device k from master device 102 through a slave device s, flow engine 202 determine the preclusive/exclusionary threshold value or minimum threshold of data value ($Th_{smin}$) needed in a buffer (e.g., memory 206) associated with master device 102 for the representative user equipment device k before it becomes beneficial to transfer data for transmission via one or more of the slave devices s. In order for one or more slave devices s to qualify for data from master device 102, flow engine 202 needs to determine whether the following condition has been satisfied for each of the slave devices:

$$B_m > Th_{s\,min},$$

where $Th_{smin} = R_m \times L_{smin}$, and $B_m$ is the buffer size for a representative user equipment device k allocated at the master device m, and $R_m$ is the average data rate experienced by user equipment device k at the master device m.

Once flow engine 202 has identified a set/group/grouping of qualifying slave devices, wherein for the purposes of this exposition and/or under identified/identifiable/defined/definable circumstances, a set is not an empty set and/or is not a null set, and/or has at least one member, that satisfy the foregoing condition, flow engine 202 can determine and thereafter employ a further threshold value, an optimal/optimality threshold value. This additional threshold value can be of benefit in situations when, since an increasing amount of data is being split from the master device m (e.g. master device 102) and is being directed to one or more of the set/group/grouping of qualifying slave devices s for transmission to a representative user equipment device k, the corresponding latency to transmit each additional byte/bit using the facilities provided by one or more of the set/group/grouping of qualifying slave devices rather than master device 102, as will be recognized by those of skill in the art, increases commensurately. At some point an upper bound/ threshold value can be surpassed at which point it is no longer beneficial to transmit any further data to a representative user equipment device k using the facilities provided by one or more of the set/group/grouping of qualifying slave devices s. This boundary value/threshold value (e.g., optimal/optimality threshold value denoted as $Th_{sopt}$) can represent a data volume threshold value at which transmission of one additional byte/bit of data represents/experiences the same latency as if that one additional byte/bit were transmitted via facilities provided by the master device m (e.g., master device 102) rather than one or more of the identified/qualifying slave devices s. This boundary value/threshold value can be determined by flow engine 202 solving for $Th_{sopt}$ in the follow equation:

$$\frac{Th_{sopt}}{R_m} = T_{m,s} + \frac{B_s + Q_s + (B_m + Th_{sopt})}{R_s},$$

which flow engine 202 simplifies to:

$$Th_{sopt} = \frac{((T_{m,s} \times R_s) + B_s + Q_s + B_m) \times R_m}{(R_m + R_s)}$$

Flow engine 202 can then correspondingly and respectively assign the determined optimal/optimum threshold value to each slave device comprising the set/group/grouping of qualifying slave devices s. Once flow engine 202 has respectively assigned the determined optimal/optimum threshold values to each slave device comprising the set/group/grouping of qualifying slave devices s, flow engine 202 can impose a ranking on the set/group/grouping of qualifying slave devices s, wherein slave devices with a lower optimal/optimum threshold value are ranked above slave devices with greater optimal/optimum threshold values.

Having ranked and/or sorted the qualified/identified slave devices included in the set/group/grouping of qualifying slave devices as a function on their respective optimal/optimum threshold values, flow engine 202 can facilitate offloading of data transmissions directed to user equipment device k to the qualified/identified slave devices included in the set/group/grouping of qualifying slave devices in accordance with a water filling process.

The water filling process facilitated by flow engine 202 causes data transmissions directed toward user equipment device k to be offloaded to a first slave device of the one or more of the set/group/grouping of identified/qualified slave devices, wherein the first slave device has been ranked as having the lowest determined optimal/optimum threshold value ($Th_{sopt}$). Flow engine 202 can continue using the first slave device of the one or more of the set/group/grouping of identified/qualified slave devices until a determined optimal/optimum threshold value ($Th_{sopt}$) associated with a second slave device of the one or more of the set/group/grouping of identified/qualified slave devices is approached and/or surpassed, at which point flow engine 202 can use the transmission facilities provided by both the first slave device as well as the second slave device. This pattern of offloading data transmissions directed toward user equipment device k to slave devices comprising the set/group/grouping of identified/qualified slave devices for transmission using the transmission facilities of the set/group/grouping of identified/qualified slave devices can continue until all data transmissions in the buffer allocated by master device 102 for the purposes of transmitting user data to user equipment device k has been complete.

Additionally and/or alternatively, flow engine 202 can utilize a multiplier or a biasing coefficient $\alpha_s$ value, wherein the value of the product of biasing coefficient $\alpha_s$ and the optimum threshold value ($Th_{sopt}$) determined for each slave device in the set/group/grouping of identified/qualified slave devices either decreases or enhances the optimum threshold value ($Th_{sopt}$), thereby making it more or less likely that master device 102 will offload data traffic to a particular slave device in relation to other slave devices. Conditions that can warrant the need to lessen or enhance the optimal threshold values can include instances where a slave device is approaching a known busy hour based on a traffic pattern history; situations where Physical Resource Block (PRB) licensing or spectrum licensing constraints are applicable at a slave device; and/or skewing or preferentially causing, based at least in part on or as a function of the biased optimum threshold value (e.g., $\alpha_s \times Th_{sopt}$), selection of licensed band slave devices over unlicensed slave devices.

Figure 3:
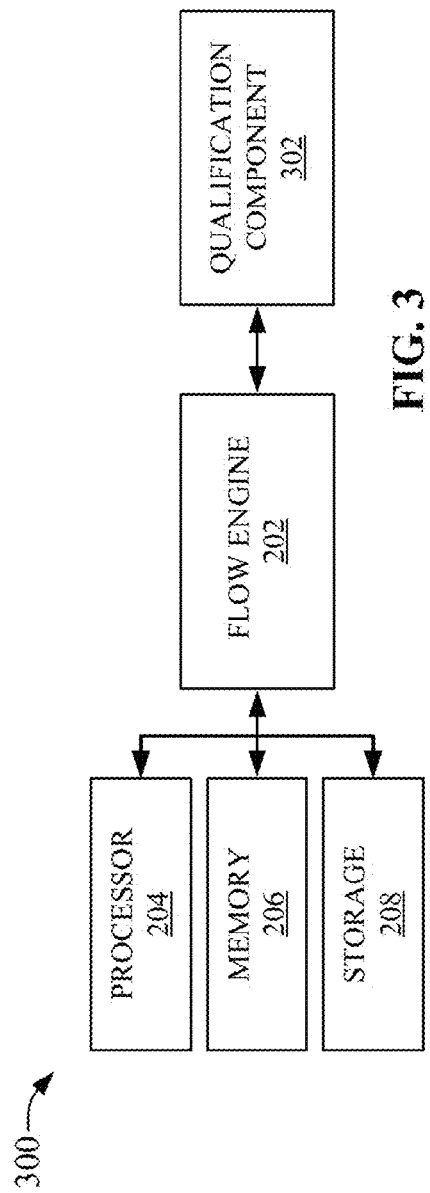
FIG. 3 provides illustration of an additional system for providing efficient traffic flow control in 5G wireless communication networks, in accordance with aspects of the subject disclosure.

With reference of FIG. 3, a further depiction of master device 102 is illustrated as system 300. System 300 provides efficient traffic flow control in a wireless communication network, in accordance with additional embodiments. As depicted, system 300 can include qualification component 302 that can utilize facilities provided by flow engine 202, processor 204, memory 206, and storage 208 to determine a qualification threshold value ($Th_{smin}$) for each slave device. The qualification threshold value ($Th_{smin}$) can be a minimum amount of data that needs to be accumulated in a buffer (e.g., memory 206 or storage 208) associated with and allocated at the master device 102 before, in order to maximize traffic flow, it makes sense to transmit further data via one or more slave devices. The minimum qualification threshold value generally is estimated by qualification component 302 for each slave device, wherein a minimum latency ($L_{smin}$) value is initially determined by qualification component 302 for each slave device needed to transmit an additional byte of data to a representative user equipment device k from a buffer associated with master device 102 via each slave device is determined as:

$$L_{S\,min} = T_{m,s} + \frac{B_s + Q_s}{R_S}$$

where $T_{m,s}$ represents a one way transport latency between master device 102 (denoted as m) and a slave device (denoted as s), $B_s$ represents a buffer size allocated for the representative user equipment device k at slave device s, $Q_s$ is the amount to data queued up in transit over the transport network for the representative user equipment device k between master device m and the slave device s, and $R_s$ represents the average data rate experienced by the representative user equipment device k at the slave device s.

Qualification component 302, in response to determining a minimum latency ($L_{smin}$) value for each slave device to transmit an additional byte/bit of data to a representative user equipment device k via a slave device s, can determine the minimum threshold value ($Th_{smin}$) needed in a buffer (e.g., memory 206 or storage 208) associated with master device 102 for the representative user equipment device k before it becomes beneficial to transfer data for transmission via one or more of the slave devices s. In order for one or more slave devices s to qualify for data from master device 102, qualification component 302 needs to determine whether the following condition has been satisfied for each of the slave devices:

$$B_m > Th_{s\,min}$$

where $Th_{smin} = R_m \times L_{smin}$, and $B_m$ is the buffer size for a representative user equipment device k allocated at the master device m, and $R_m$ is the average data rate experienced by user equipment device k at the master device m.

Slave devices that satisfy the foregoing condition can thereafter be included, by qualification component 302, into a set/group/grouping of qualifying slave devices. It should be observed that for the purposes of present disclosure, and under defined/definable circumstances, a set is not to be considered as an empty set and/or is not contemplated to be a null set, and as such has at least one member, that satisfies the foregoing condition.

Figure 4:
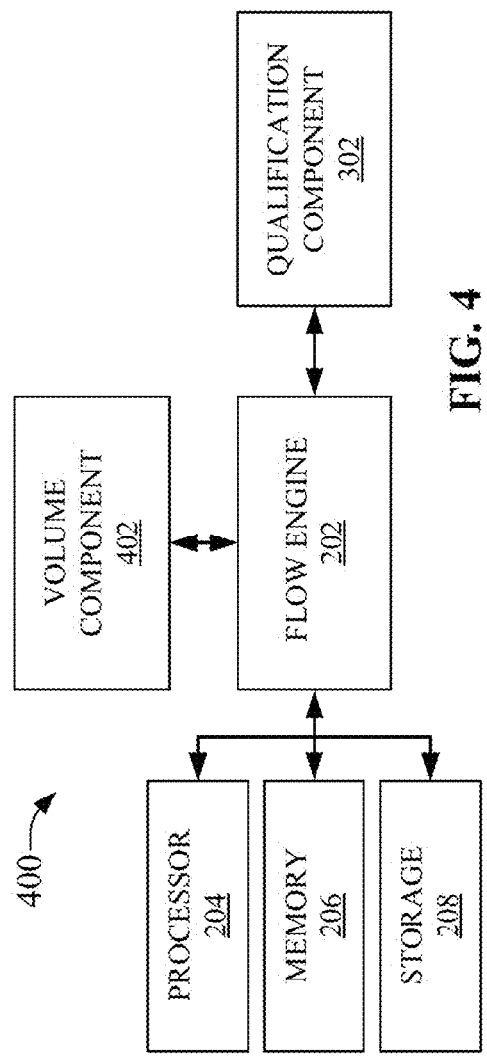
FIG. 4 provides another illustration of a system for providing efficient traffic flow control in multi-radio access technology 5G wireless communication networks, in accordance with aspects of the subject disclosure.

With reference to FIG. 4 that provides further detail 400 in relation of master device 102 in the context of providing efficient traffic flow control in a communication network, in accordance with further embodiments. As depicted, master device 102, in addition to flow engine 202 and qualification component 302, can also comprise volume component 402. Volume component 402 in conjunction with flow engine 202, processor 204, memory 206, storage 208, and qualification component 302 can determine and utilize a data volume threshold value, an optimal/optimality threshold value. This data volume threshold value can be of benefit in instances where because an increasing amount of data is being split from the master device m (e.g., master device 102) and is being directed to one or more of the previously determined (e.g. determined by qualification component 302) set/group/grouping of qualifying slave devices s for transmission to a representative user equipment device k, the corresponding latency to transmit each additional byte/bit using the facilities provided by the one or more of the set/grouping/group of qualifying slave device rather than facilities provided by the master device 102 can increase commensurately. At some point an upper boundary value can be surpassed at which point it is no longer beneficial to transmit any further data to a representative user equipment device k using the facilities provided by one or more of the set/group/grouping of qualifying slave devices s. This boundary value/threshold value (e.g., optimal/optimality threshold value denoted as $Th_{sopt}$) can represent a data volume threshold value at which point transmission of one additional byte/bit of data represents/experiences the same latency as if that one additional byte/bit were transmitted using the facilities provided by the master device m (e.g., master device 102) rather than one or more of the identified/ qualifying slave devices s. This boundary value/threshold value can be determined by volume component 402 as a function of the following equation:

$$\frac{Th_{sopt}}{R_m} = T_{m,s} + \frac{B_s + Q_s + (B_m + Th_{sopt})}{R_s},$$

which volume components 402 simplifies to:

$$Th_{sopt} = \frac{((T_{m,s} \times R_s) + B_s + Q_s + B_m) \times R_m}{(R_m + R_s)}$$

Volume component 402 can then correspondingly and respectively assign the determined optimal/optimum threshold value ($Th_{sopt}$) to each slave device comprising the set/group/grouping of qualifying slave devices s. Once volume component 402 has respectively assigned and determined optimal/optimal threshold values to each slave device included in the set/group/grouping of qualifying slave devices s, volume component 402 can impose a ranking on the set/group/grouping of qualifying slave devices s, wherein slave devices with a lower optimal/optimal threshold value are ranked above slave devices with greater optimal/optimal threshold values.

Figure 5:
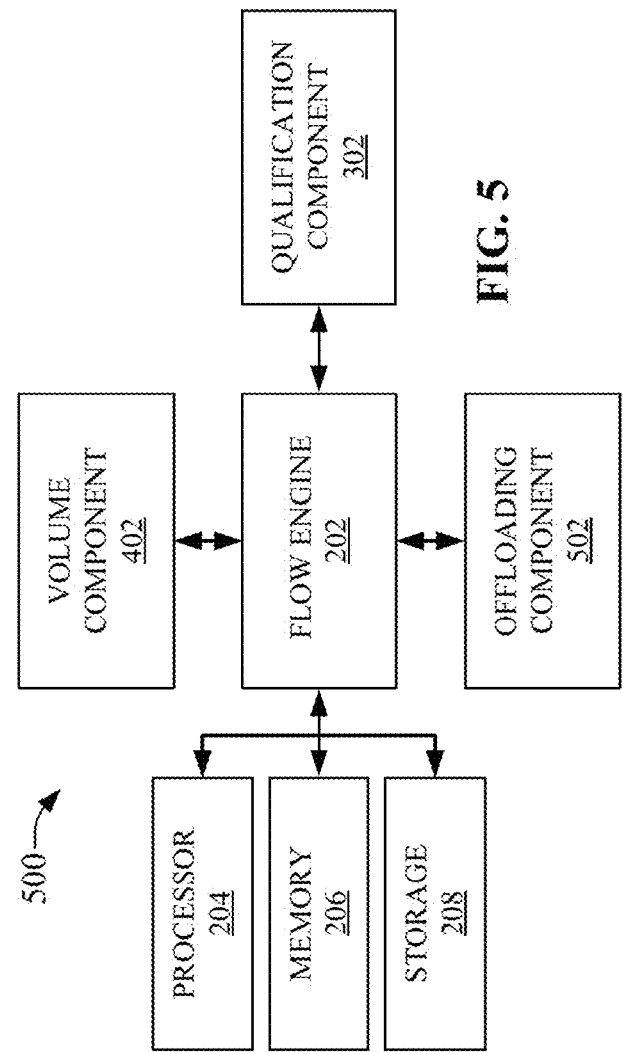
FIG. 5 illustrates another depiction of a system for providing efficient traffic flow control in wireless communication networks, in accordance with aspects of the subject disclosure.

FIG. 5 provides additional illustration 500 of master device 102 for controlling traffic flows in a multi-radio access technology communication infrastructure. As illustrated, master device 102 can include offloading component 502 that in conjunction with flow engine 202, processor 204, memory 206, storage 208, qualification component 302, and/or volume component 402, and as a function of, or based at least in part on, the ranked or ordered set/group/grouping of qualified/identified slave devices s, can offload data transmissions directed toward user equipment device k to one or more of the slave devices s included in the ordered or ranked set/group/grouping of qualified/identified slave devices. Offloading component 502 can accomplish the redirection of data transmissions to user equipment device k via the broadcast facilities and/or functionalities provided by one or more of the slave devices s included in the ordered or ranked set/group/grouping of qualified/identified slave devices by identifying a first slave device included in the ordered or sorted set/group/grouping of qualified/identified slave devices with a lowest determined and associated optimal/optimum threshold value ($Th_{sopt}$). Offloading component 502, based at least in part on the foregoing identification of a first slave device, can offload to the identified first slave device data transmissions that are to be transmitted to user equipment device k by functionalities supplied by the identified first slave device. Offloading component 502 can continue to offload to the identified first slave device data transmissions that are to be directed to user equipment device k using the transmission facilities provided by the first identified slave device until such time that offloading component 502 ascertains/determines that an optimal/optimum threshold value ($Th_{sopt}$) associated with a second identified slave device is being approached and/or surpassed, at which point, offloading component 502 can commence offloading data transmissions that are to be transmitted to user equipment device k to both the first identified slave device and the second identified slave device, wherein the first identified slave device and the second identified slave device transmit the offload data transmissions to the user equipment device k. Offloading component 502 can continue the foregoing pattern of offloading data transmissions directed toward user equipment device k to slave devices comprising or included in the set/group/grouping of identified/qualified slave devices until all data transmissions in the buffer allocated at master device 102 for the purposes of transmitting user data to user equipment device k has been exhausted.

Figure 7:
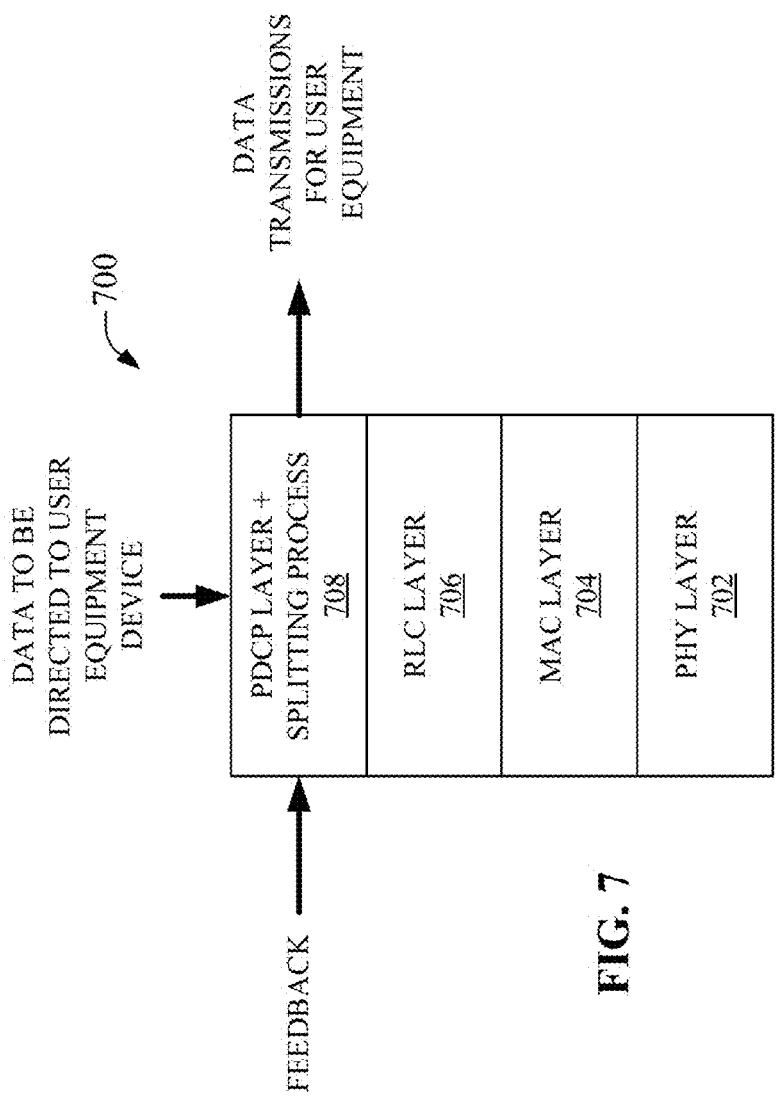
FIG. 7 depicts a protocol stack or control plane protocol stack operational on master node device for the provision of an efficient traffic flow control in multi-radio access technology wireless communication networks, in accordance with aspects of the subject disclosure.

FIG. 7 provides depiction of an illustrative protocol stack or control plane protocol stack 700 that can be operational on master device 102. As illustrated, the protocol stack or control plane protocol stack 700 operational on master device 102 can include physical (PHY) layer 702 that can provide radio interfaces for the basic networking hardware transmission technologies associated with the multi-radio access technology 5G wireless communication infrastructure. The protocol stack or control plane protocol stack 700 also includes medium access control (MAC) layer 704 that can be responsible for scheduling data according to priorities, and multiplexing data into transport blocks. Medium access control layer 704 can also provide error correction facilities/functionalities. Further, protocol stack or control plane protocol stack 700 can also comprise radio link control (RLC) layer 706 that can be responsible for the segmenting and concatenating of packet data convergence protocol (PDCP) packet data units (PDUs) for radio interface transmission. Radio link control layer 706 can also perform error correction using, for example, an automatic repeat request (ARQ) process. Further, as illustrated, protocol stack or control plane protocol stack 700 can also include packet data convergence protocol (PDCP) layer 708 that provides internet protocol (IP) header compression, encryption and integrity protection. Additionally, as outlined and detailed in the subject application in connection with FIGS. 1-6, packet data convergence protocol layer 708 can also facilitate performance of the foregoing disclosed and detailed traffic splitting process that enables efficient traffic flow control in a multiple-radio access technology 5G wireless communication infrastructure.

Figure 8:
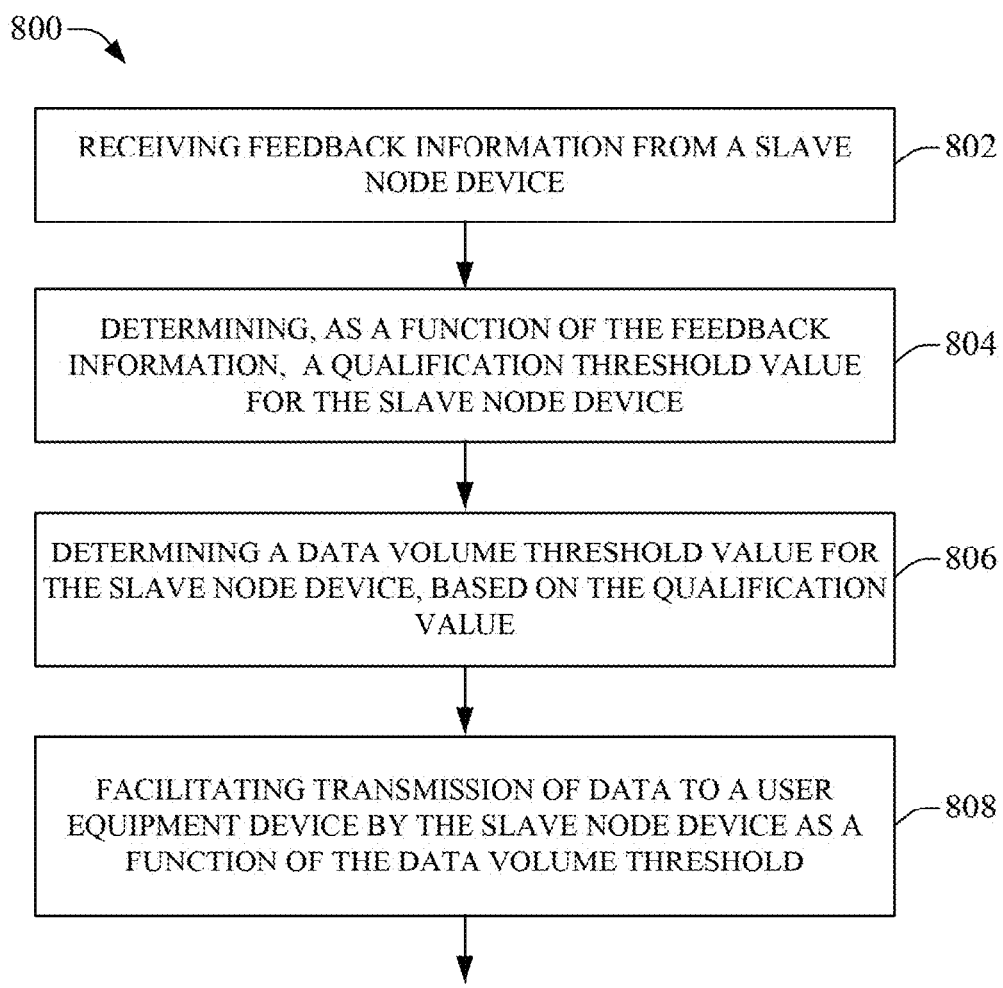
FIG. 8 provides another illustration of a flow chart or method for providing efficient traffic flow control in wireless communication networks, in accordance with aspects of the subject disclosure.

In view of the example system(s) described above, example method(s) that can be implemented in accordance with the disclosed subject matter can be better appreciated with reference to flowchart in FIG. 8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for the provision of efficient traffic flow control in wireless communication infrastructures. As illustrated, method 800 can be performed on a master node device (e.g., master device 102) and can commence at 802, whereupon feedback information from one or more slave node devices (e.g., first slave device 104, second slave device 106, and/or third slave device 108) can be received. On receiving feedback information from the one or more slave node devices, at 804 a determination can be made in regard to a qualification threshold value to be associated with each of the one or more slave node devices. The determination in regard to the qualification threshold value can be made as a function of the feedback information received from each of the one or more slave node devices. The qualification threshold value can be utilized to winnow out slave node devices that are incapable, based at least in part on the qualification threshold value, of currently servicing requests to transmit data transmissions to user equipment devices (e.g., user equipment device 110) in the broadcast ambit or geographic transmission range of the master node device (e.g., master device 102), and on behalf of, the master node device. At 806, in response to the determination of the qualification threshold value and based at least in part of the qualification threshold value, a data volume threshold value for each slave node device can be determined. The data volume threshold value assigned to each slave node device can be utilized to form an ordered or ranked set/grouping/group of qualified/identified slave node devices that are currently capable of servicing request to transmit data transmissions to user equipment devices on behalf of the master node device. At 808, based at least in part on the ordered or ranked set/grouping/group of qualified/identified slave node devices currently capable of servicing requests to transmit data transmissions to user equipment devices on behalf of the master node device, data transmissions to be transmitted using the facilities of one or more of the slave node devices included in the ordered or ranked set/grouping/group of qualified/identified slave node devices can be offloaded from master node device (e.g., from a buffer allocated at master node device for the purposes of transmitting data transmissions to user equipment devices) to the one or more slave node devices included in the ordered or ranked set/grouping/group of qualified/identified slave node devices. The offloading of data transmission from the master node device to slave node devices for subsequent transmission by the slave node devices to the user equipment devices can be performed in accordance with, and in consecution with the water filling process described in the context of FIGS. 1 and 6.

Figure 9:
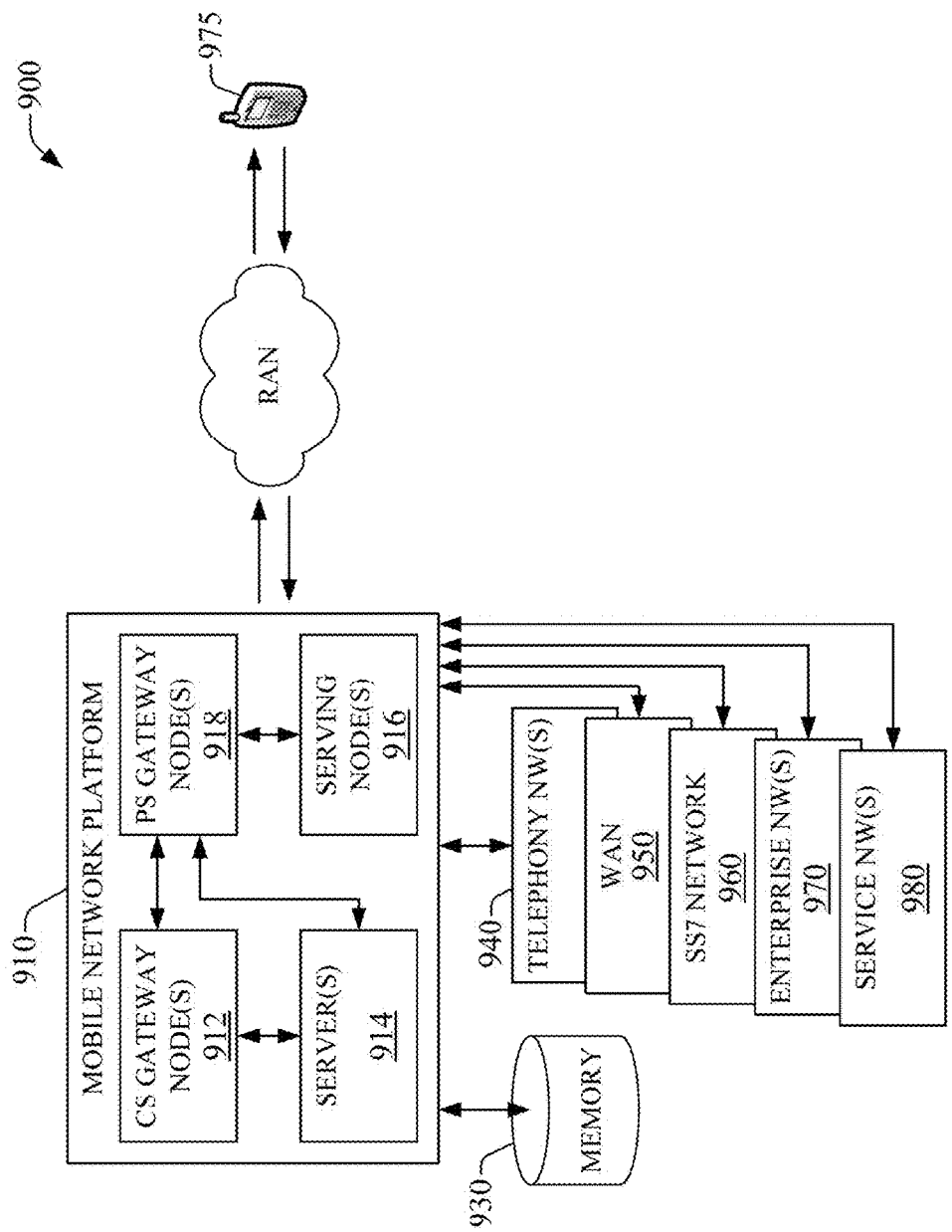
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
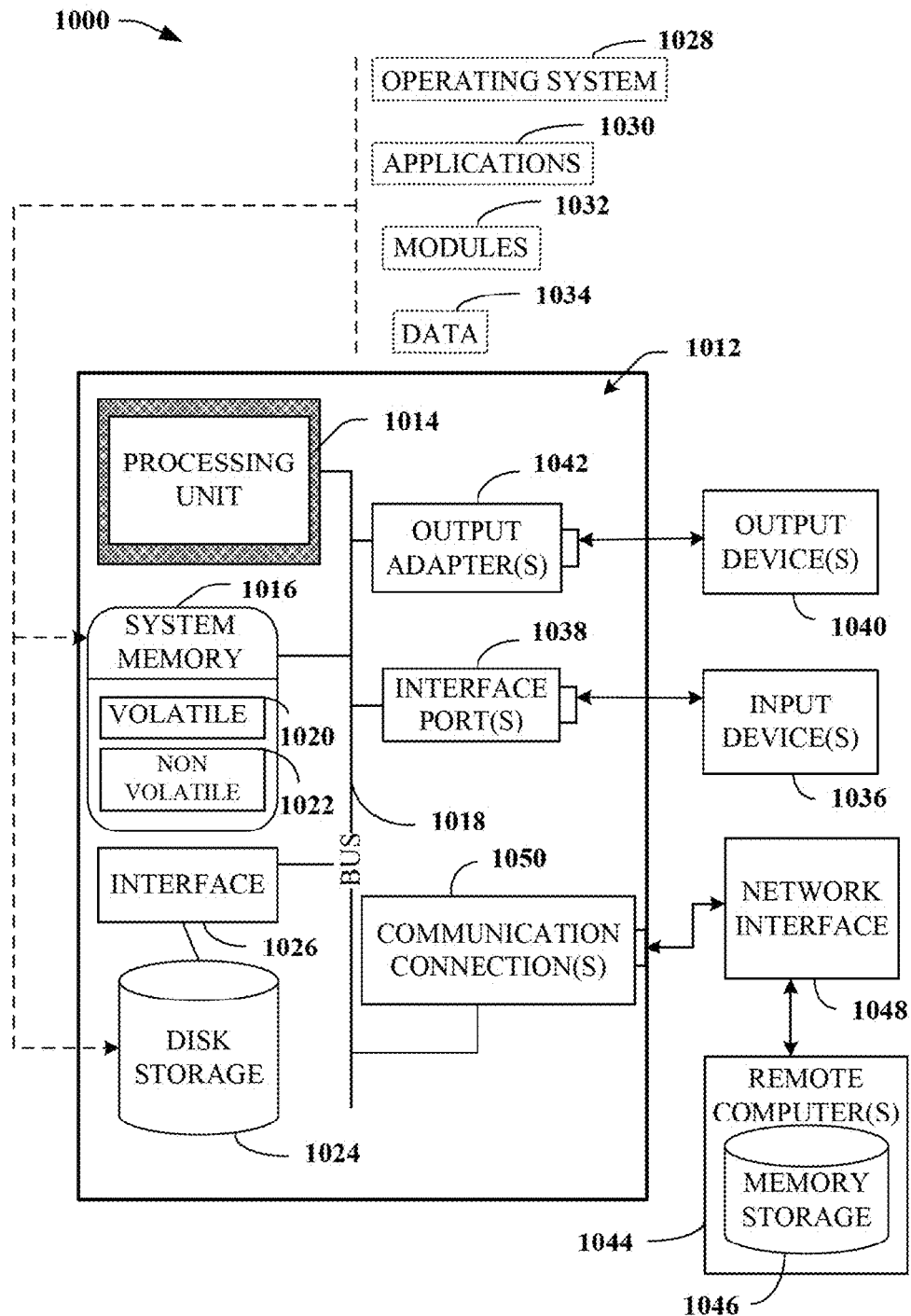
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MS A), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device 102 and/or portable device 104 can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A device, comprising:
a processor; and
a memory that stores executable instructions that, when executed by the processor, facilitate performance of operations, comprising:
  determining a data volume threshold based on a qualification value assigned to a slave node device;
  ranking the slave node device based on the data volume threshold and a first optimization threshold value assigned to the slave node device relative to second optimization threshold values respectively assigned to other ones of a group of slave node devices comprising the slave node device; and
  facilitating a transmission of data to a user equipment device by the slave node device based on the ranking of the slave node device.
2. The device of claim 1, wherein the operations further comprise determining the qualification value as a function of a product of
  a minimum latency value associated with transferring a byte of data for the user equipment device to the slave node device, and
  a data throughput rate for the transmission of the data from the device to the user equipment device.
3. The device of claim 1, wherein the operations further comprise determining a data volume threshold value as a function of comparing a first latency value associated with a first transmitting of a byte of data via the slave node device, and a second latency value associated with a second transmitting of the byte of data by the device.

4. The device of claim 1, wherein the transmission of data to the user equipment device by the slave node device is a first transmission, and wherein the operations further comprise receiving feedback data representing a buffer size value of a buffer allocated for second transmissions to be transmitted to the user equipment device by the slave node device.

5. The device of claim 4, wherein the feedback data further comprises a first value representing an amount of data queued awaiting transmission to the user equipment device between the device and the slave node device.

6. The device of claim 4, wherein the feedback data further comprises a second value representing an average data rate determined to have been experienced by the user equipment device and the slave node device.

7. The device of claim 1, wherein the operations further comprise excluding the slave node device from the group of slave node devices in response to a buffer size value of a buffer allocated for data transmissions to the user equipment device on the device being determined to have exceeded the qualification value.

8. The device of claim 1, wherein the transmission of data to the user equipment device by the slave node device is a first transmission, wherein the slave node device is a first slave node device, and wherein the operations further comprising offloading second transmissions associated with the user equipment device to the first slave node device.

9. The device of claim 8, wherein the first slave node device is associated with a determined lowest data volume threshold value.

10. A method, comprising:
    determining, by a system comprising a processor, a data volume threshold value as a function of a qualification value assigned to a slave node device;
    ranking, by the system, the slave node device based on the data volume threshold value and an optimization threshold value assigned to the slave node device relative to other optimization threshold values respectively assigned to other ones of a group of slave node devices other than the slave node device; and
    facilitating, by the system, a transmission of data to a user equipment device using a transmission functionality associated with the slave node device based on a rank resulting from the ranking of the slave node device.

11. The method of claim 10, further comprising determining, by the system, the qualification value as a function of a product of
    a latency value associated with transferring a byte of data for the user equipment device to the slave node device, and
    a data throughput rate for the transmission of the data, by the system, to the user equipment device.

12. The method of claim 10, further comprising determining, by the system, the data volume threshold value as a function of comparing a first latency value to a second latency value, wherein the first latency value is associated with a first transmission of a byte of data via the slave node device, and wherein the second latency value is associated with a second transmission of the byte of data by the system.

13. The method of claim 10, wherein the transmission of the data is a first transmission of first data, and further comprising receiving, by the system, feedback data representing a buffer size value of a buffer allocated for second transmissions of second data to be transmitted to the user equipment device by the slave node device.

14. The method of claim 13, wherein the feedback data further comprises a first value representing an amount of data awaiting transmission to the user equipment device between the system and the slave node device.

15. The method of claim 13, wherein the feedback data further comprises a second value representing an average data rate experienced by the user equipment device and the slave node device.

16. The method of claim 10, further comprising removing, by the system, the slave node device from the group of slave node devices as a function of a buffer size value of a buffer allocated for data transmissions to the user equipment device at the system exceeding the qualification value.

17. The method of claim 10, wherein the slave node device is a first slave node device, and further comprising offloading, by the system, second transmissions of second data associated with the user equipment device to the first slave node device.

18. A computer readable storage device comprising executable instructions that, in response to execution, cause a system comprising a processor to perform operations, comprising:
    as a function of a qualification threshold value, determining a data volume threshold value for a slave node device;
    based on the data volume threshold value and an optimization threshold value assigned to the slave node device relative to optimization threshold values respectively assigned to a group of slave node devices, ranking the slave node device resulting in a rank of the slave node device; and
    as a function of the rank of the slave node device, facilitating a transmission of a data transmission to a user equipment device by the slave node device.

19. The computer readable storage device of claim 18, wherein the operations further comprise determining the qualification threshold value as a function of a latency value associated with a first transfer of a byte of data to the user equipment device using a functionality provided by the slave node device and a data throughput rate for a second transfer of the data transmission from the system to the user equipment device.

20. The computer readable storage device of claim 18, wherein the operations further comprise determining the data volume threshold value based on a result of comparing a first latency value associated with a first transmission of a byte of data via the slave node device with a second latency value associated with a second transmission of the byte of data by the system.

* * * * *